(12) United States Patent
Nakazono et al.

(10) Patent No.: US 11,566,597 B2
(45) Date of Patent: Jan. 31, 2023

(54) STARTUP METHOD OF FRANCIS TURBINE AND FRANCIS TURBINE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Masahiko Nakazono, Kawasaki Kanagawa (JP); Ryosuke Shima, Kawasaki Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/351,366

(22) Filed: Jun. 18, 2021

(65) Prior Publication Data
US 2021/0396205 A1 Dec. 23, 2021

(30) Foreign Application Priority Data
Jun. 19, 2020 (JP) .............................. JP2020-106306

(51) Int. Cl.
*F03B 15/00* (2006.01)
*F03B 3/02* (2006.01)
*F03B 3/18* (2006.01)

(52) U.S. Cl.
CPC ............. *F03B 15/005* (2013.01); *F03B 3/02* (2013.01); *F03B 3/183* (2013.01); *F05B 2220/32* (2013.01); *F05B 2270/101* (2013.01)

(58) Field of Classification Search
CPC ....... F03B 3/02; F03B 3/183; F05B 2270/101
See application file for complete search history.

(56) References Cited

U.S. PATENT DOCUMENTS 3,236,498 A * 2/1966 Kerensky ................ F03B 15/06
415/164
3,237,563 A * 3/1966 Hartland ................. F03B 3/183
415/910

FOREIGN PATENT DOCUMENTS

JP H09-222069 A 8/1997

OTHER PUBLICATIONS

J.H. Gummer, et al., "Cracking of Francis runners during transient operation," Hydropower & Dams Issue Four, 2008, 6 pages.
(Continued)

*Primary Examiner* — J. Todd Newton
*Assistant Examiner* — Brian O Peters
(74) *Attorney, Agent, or Firm* — Foley & Lardner LLP

(57) ABSTRACT

A startup method of a Francis turbine according to an embodiment includes: a first rotation-speed increasing step in which a rotation speed of the runner is increased by opening the guide vane at a first opening; a second rotation-speed increasing step in which the increase in the rotation speed of the runner is accelerated by opening the guide vane at a second opening that is larger than the first opening after the first rotation-speed increasing step; and a rotation-speed regulating step in which the rotation speed of the runner is regulated to a rated rotation speed by opening the guide vane at a no-load opening after the second rotation-speed increasing step. The first opening is an opening that is half or less than the no-load opening.

3 Claims, 4 Drawing Sheets

(56) References Cited

OTHER PUBLICATIONS

U. Seidel, et al., "Dynamic loads in Francis runners and their impact on fatigue life", Voith Hydro Holding GmbH & Co. KG, 2014 IOP Conf. Ser., 9 pages.

* cited by examiner

STARTUP METHOD OF FRANCIS TURBINE AND FRANCIS TURBINE

CROSS REFERENCE TO RELATED APPLICATION

This application is based upon and claims the benefit of priority from Japanese Patent Application No. 2020-106306, filed on Jun. 19, 2020, the entire contents of which are incorporated herein by reference.

FIELD

Embodiments described herein relate generally to a startup method of a Francis turbine and a Francis turbine.

BACKGROUND

When a turbine of a Francis turbine is operated, water from an upper reservoir is guided from an inlet pipe to a casing through an inlet valve. The water having flown into the casing passes through stay vanes and guide vanes to be guided to a runner. A flow rate of the water is regulated by the guide vanes. The runner is driven in rotation by the water flowing into the runner, so that a generator connected to the runner via a main shaft is driven to generate electricity. Thereafter, the water flows out from the runner to be discharged to a lower reservoir or a tailrace through a draft tube.

Such a Francis turbine is usually started up as follows. An inlet valve provided to an inlet pipe is opened to allow water to flow into the casing. Then, the guide vanes are opened at a startup opening to drive the runner in rotation by the water flowing thereinto, so that a rotation speed of the runner increases. After that, the guide vanes are opened at a no-load opening, so that the rotation speed of the runner is regulated to a rated rotation speed.

However, when the guide vanes are opened at the aforementioned startup opening upon startup of the Francis turbine, an annular flow path is formed between the guide vanes and the runner in the radial direction. The water having passed through the guide vanes may flash through the annular flow path, creating a fast swirling flow around the runner. When the swirling flow collides with runner blades, a separation flow may occur. Particularly when a Francis turbine with a large head, the swirling flow becomes faster and a stronger separation flow may occur. At this time, a pressure inside the runner may decrease down to a saturated water vapor pressure or below. This causes the water to evaporate, so that water vapor bubbles are generated in the water. At the moment when the water vapor in the water vapor bubbles condenses, the pressure may abruptly increase. This may damage the runner because an impact load may be applied to the runner.

DETAILED DESCRIPTION

A startup method of a Francis turbine according to an embodiment is a startup method of a Francis turbine comprising a guide vane capable of regulating a flow rate of water to be guided to a runner. The startup method of a Francis turbine comprises: a first rotation-speed increasing step in which a rotation speed of the runner is increased by opening the guide vane at a first opening; a second rotation-speed increasing step in which the increase in the rotation speed of the runner is accelerated by opening the guide vane at a second opening that is larger than the first opening after the first rotation-speed increasing step; and a rotation-speed regulating step in which the rotation speed of the runner is regulated to a rated rotation speed by opening the guide vane at a no-load opening after the second rotation-speed increasing step. The first opening is an opening that is half or less than the no-load opening.

In addition, a Francis turbine according to the embodiment comprises: a runner; a guide vane capable of regulating a flow rate of water to be guided to the runner; and a control unit that controls the guide vane. The control unit controls the guide vane to perform: a first rotation-speed increasing step in which a rotation speed of the runner is increased by opening the guide vane at a first opening; a second rotation-speed increasing step in which the increase in the rotation speed of the runner is accelerated by opening the guide vane at a second opening that is larger than the first opening after the first rotation-speed increasing step; and a rotation-speed regulating step in which the rotation speed of the runner is regulated to a rated rotation speed by opening the guide vane at a no-load opening after the second rotation-speed increasing step. The first opening is an opening that is half or less than the no-load opening.

The startup method of a Francis turbine and the Francis turbine according to the embodiment of the present invention will be described herebelow with reference to the drawings.

Figure 1:
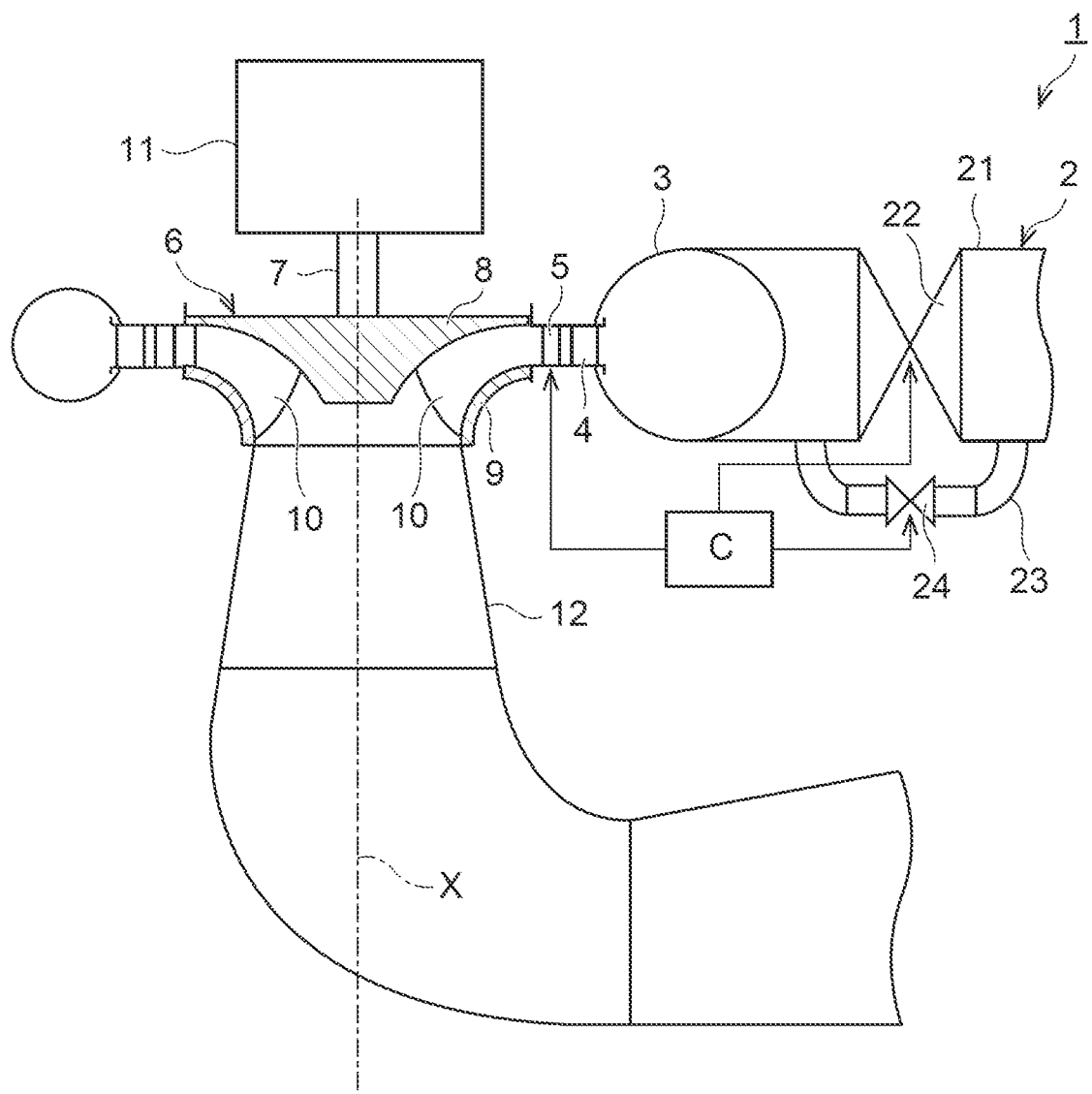
FIG. 1 is a meridional cross-sectional view of a Francis turbine according to an embodiment.
Figure 2:
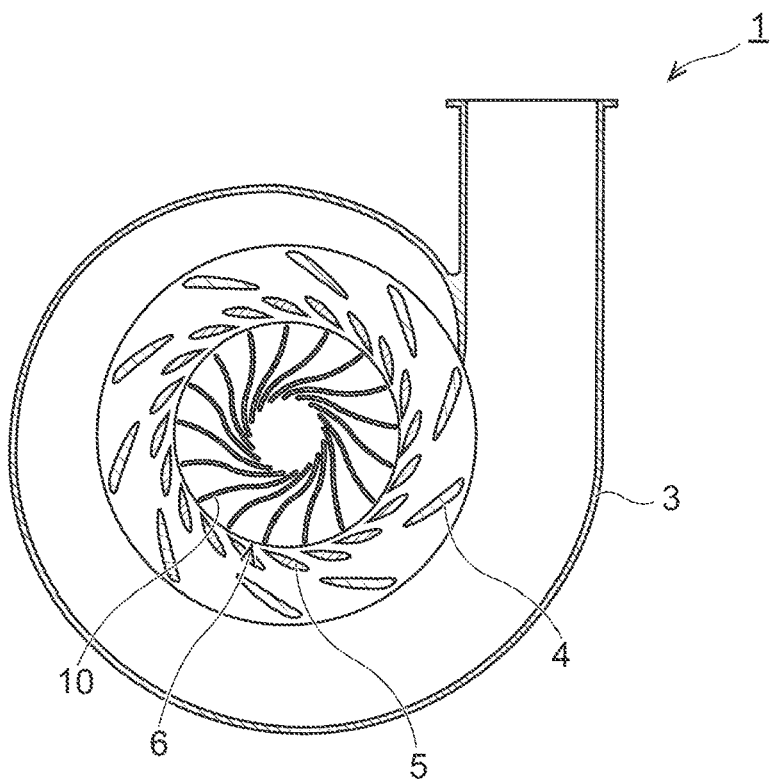
FIG. 2 is a top cross-sectional view of the Francis turbine shown in FIG. 1, which is in operation.
Figure 3:
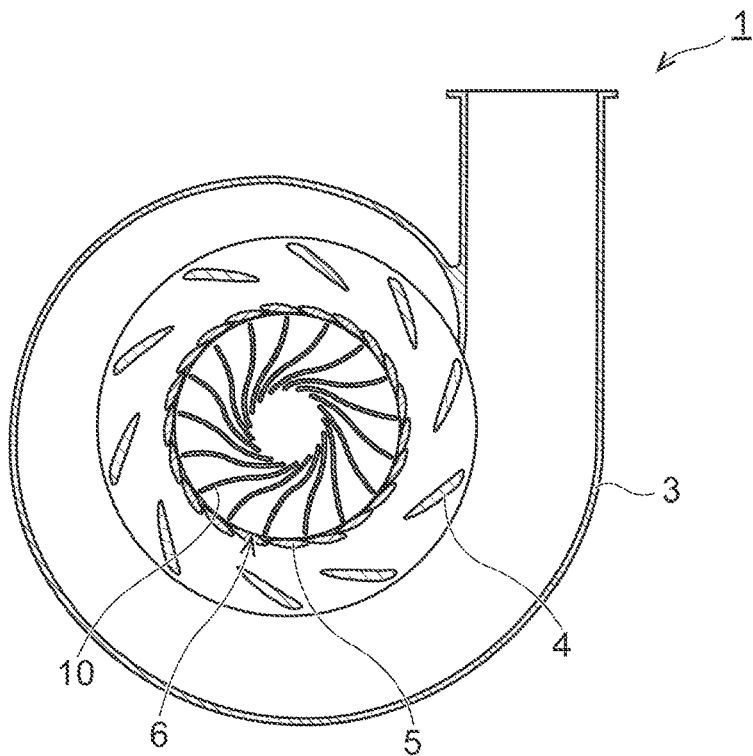
FIG. 3 is a top cross-sectional view of the Francis turbine shown in FIG. 1, which is at rest.

The Francis turbine according to the embodiment is described by means of FIGS. 1 to 3. Herebelow, the embodiment is described in line with a water flow when the turbine is operated.

As shown in FIGS. 1 to 3, a Francis turbine 1 comprises an inlet system 2, a casing 3, a plurality of stay vanes 4, a plurality of guide vanes 5 and a runner 6. In FIGS. 2 and 3, illustration of the inlet system 2 is omitted.

The inlet system 2 is configured to guide water from an upper reservoir, not shown, to the casing 3. The inlet system 2 has an inlet pipe 21, an inlet valve 22 provided to the inlet pipe 21, a bypass pipe 23 bypassing the inlet valve 22 and a bypass valve 24 provided to the bypass pipe 23.

The inlet pipe 21 is connected to a penstock extending from the upper reservoir, not shown, and the casing 3. The inlet pipe 21 is configured to allow water from the not-shown upper reservoir to flow therethrough so as to guide the water to the casing 3.

The inlet valve 22 is provided to the inlet pipe 21. The inlet valve 22 is configured to allow the water flow in the inlet pipe 21 when opened and to block the water flow in the inlet pipe 21 when closed. When the Francis turbine 1 is at rest, the inlet valve 22 is closed. On the other hand, when the Francis turbine 1 is in operation, the inlet valve 22 is opened. The opening and closing of the inlet valve 22 may be controlled by a control unit C described below.

The bypass pipe 23 is connected to a part of the inlet pipe 21, which is upstream of the inlet valve 22, and to a part of the inlet pipe 21, which is downstream of the inlet valve 22. The bypass valve 23 is configured to bypass the inlet valve 22 and to guide the water to the casing 3.

The bypass valve 24 is provided to the bypass pipe 23. The bypass valve 24 is configured to allow the water flow in the bypass pipe 23 when opened and to block the water flow in the bypass pipe 23 when closed. When the Francis turbine 1 is at rest, the bypass valve 24 is closed. On the other hand, when the Francis turbine 1 is in operation, the bypass valve 24 is opened. The opening and closing of the bypass valve 24 may be controlled by the control unit C described below.

The casing 3 is formed in a spiral shape. The casing 3 is configured such that the water from the inlet system 2 flows into the casing 3 to flow therethrough.

The stay vanes 4 are provided inward with respect the casing 3. The stay vanes 4 are configured to guide the water having flown into the casing 3 to the guide vanes 5 and the runner 6. As shown in FIGS. 2 and 3, the stay vanes 4 are arranged at predetermined circumferential intervals therebetween. A flow path through which water flows is formed between the stay vanes 4.

The guide vanes 5 are provided inward with respect to the stay vanes 4. The guide vanes 5 are configured to guide water having flown thereinto to the runner 6. As shown in FIG. 2, the guide vanes 5 are arranged at predetermined circumferential intervals therebetween. A flow path through which water flows is formed between the guide vanes 5. Each guide vane 5 is configured to be rotatable, whereby a flow rate of water to be guided to the runner 6 can be regulated by rotating the guide vanes 5 to vary an opening G. As shown in FIG. 3, when the Francis turbine 1 is at rest, the guide vanes 5 are closed. The opening G of the guide vanes 5 may be controlled by the control unit C described below.

The runner 6 is provided inward with respect to the guide vanes 5. The runner 6 is configured to be rotatable about a rotation axis X with respect to the casing 3, and is driven in rotation by the water flowing thereinto from the guide vanes 5. The runner 6 has a crown 8 connected to a main shaft 7, a band 9 provided to an outer circumferential side of the crown 8 and a plurality of runner blades 10 provided between the crown 8 and the band 9. As shown in FIGS. 2 and 3, the runner blades 10 are arranged at predetermined circumferential intervals therebetween. Each runner blade 10 is joined to the crown 8 and the band 9. A flow path (inter-blade flow path) through which water flows is formed between the runner blades 10. Water from the guide vanes 5 flows through the respective flow paths. The respective runner blades 10 receive a pressure from the water, so that the runner 6 is driven in rotation. Thus, energy of the water flowing into the runner 6 is converted to rotational energy.

A generator 11 is connected to the runner 6 via the main shaft 7. The generator 11 is configured to receive the rotational energy transmitted from the runner 6 to generate electricity when the turbine is in operation.

A draft tube 12 is provided downstream of the runner 6. The draft tube 12 is connected to the not-shown lower reservoir or a tailrace. The water having driven the runner 6 in rotation recovers a pressure in the draft tube 12 and is discharged therefrom to the lower reservoir or the tailrace.

The generator 11 may function as an electric motor and may be configured to be supplied with electric power to drive the runner 6 in rotation. In this case, water in the lower reservoir can be sucked up through the draft tube 12 so as to be discharged to the upper reservoir, whereby the Francis turbine 1 can be used as a pump turbine for a pumping operation. At this time, the opening G of the guide vanes 5 is varied to have a suitable pumping amount depending on a pump head.

The Francis turbine 1 according to the embodiment also comprises the control unit C.

The control unit C is configured to be capable of controlling the guide vanes 5. The control unit C controls the guide vanes to perform, upon startup of the Francis turbine 1, a first rotation-speed increasing step described below, a second rotation-speed increasing step described below and a rotation-speed regulating step described below. More specifically, in the first rotation-speed increasing step, the control unit C controls the guide vanes 5 to open the guide vanes 5 at a first opening G1 so as to increase a rotation speed N of the runner 6. Then, in the second rotation-speed increasing step, the control unit C controls the guide vanes 5 to open the guide vanes 5 at a second opening G2 so as to accelerate the increase in the rotation speed N of the runner 6. After that, in the rotation-speed regulating step, the control unit C controls the guide vanes 5 to open the guide vanes 5 at a no-load opening G3 so as to regulate the rotation speed N of the runner 6 to a rated rotation speed N0.

The control unit C may be configured to be capable of controlling the inlet valve 22 and the bypass valve 24. In this case, the control unit C controls the bypass valve 24 to open the bypass valve 24 in a bypass-valve opening step of an inflow starting step described below. In addition, the control unit C controls the inlet valve 22 to open the inlet valve 22 in an inlet-valve opening step of the inflow starting step described below.

Next, a startup method of a Francis turbine according to the embodiment is described with reference to FIGS. 4A and 4B.

The startup method of the Francis turbine 1 according to the embodiment comprises an inflow starting step in which inflow of water into the casing 3 is started, a first rotation-speed increasing step in which a rotation speed N of the runner 6 reaches a first rotation speed N1, a second rotation-speed increasing step in which the rotation speed N of the runner 6 reaches a second rotation speed N2 and a rotation-speed regulating step in which the rotation speed N of the runner 6 is regulated to a rated rotation speed N0 (goal rotation speed to be accomplished).

When the Francis turbine 1 is at rest, the inlet valve 22, the bypass valve 24 and the guide vanes 5 are closed (see FIG. 3). In this state, the inflow starting step is performed. In this inflow starting step, inflow of water into the casing 3 is started. The inflow starting step includes a bypass-valve opening step in which the bypass valve 24 is opened and an inlet-valve opening step in which the inlet valve 22 is opened.

In the inflow starting step, the bypass-valve opening step is performed. In this step, the bypass valve 24 is opened with the inlet valve 22 and the guide vanes 5 closed. This allows water from the upper reservoir to flow from the inlet pipe 21 to the bypass pipe 23 so as to be guided into the casing 3 through the bypass valve 24. Thus, a pressure of the water in the casing 3 increases, so that a pressure difference between the upstream side of the inlet valve and the inside of the casing 3 decreases. This makes it easy to open and close the inlet valve 22.

Then, the inlet-valve opening step is performed. In this step, the inlet valve 22 is opened with the bypass valve 24 opened and the guide vanes 5 closed. Thus, a large amount of water is guided from the upper reservoir into the casing 3. In this manner, the inflow of water into the casing 3 starts.

After the inflow starting step, the first rotation-speed increasing step is performed. In this first rotation-speed increasing step, the guide vanes 5 are opened at a first opening G1 (minute opening G1) to increase the rotation speed N of the runner 6. The minute opening G1 is an opening that is half or less (50% or less) than the no-load opening G3 described below. The first rotation-speed increasing step includes a first opening increasing step in which the opening G of the guide vanes 5 is increased up to the minute opening G1 and a minute-opening maintaining step in which the opening G of the guide vanes 5 is maintained at the minute opening G1.

Figure 4A:
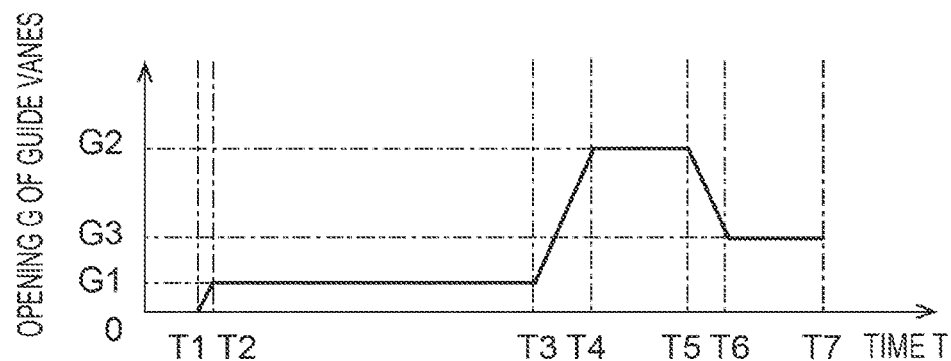
FIG. 4A is a time diagram showing an opening of guide vanes in the startup method of a Francis turbine according to the embodiment.

FIG. 4A shows an example of a time diagram showing the opening of the guide vanes 5. FIG. 4B shows an example of a time diagram showing the rotation speed N of the runner 6. In the graph of FIG. 4A, the horizontal axis indicates a time T, and the vertical axis indicates the opening G of the guide vanes 5. In the graph of FIG. 4B, the horizontal axis indicates the time T, and the vertical axis indicates the rotation speed N of the runner 6.

Figure 4B:
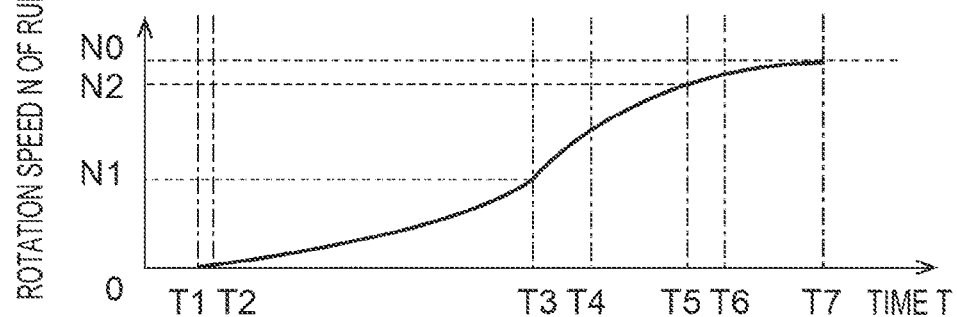
FIG. 4B is a time diagram showing a rotation speed of a runner in the startup method of a Francis turbine according to the embodiment.

In the first rotation-speed step, as shown in FIGS. 4A and 4B, the first opening increasing step is performed from a time T1 to a time T2. In this step, the opening G of the guide vanes 5 is increased from 0% (closed state) up to the minute opening G1 by rotating the guide vanes 5 to open. Thus, minute flow paths are formed between the respective guide vanes 5, and the water having flown into the casing 3 starts to flow into the runner 6 through the respective flow paths between the guide vanes 5.

Then, as shown in FIGS. 4A and 4B, the minute-opening maintaining step is performed from the time T2 to a time T3. In this step, the opening G of the guide vanes 5 is maintained at a minute opening G1. During this step, the water having flown into the casing 3 continues flowing into the runner 6 through the minute flow paths between the respective guide vanes 5 (see FIG. 7). The water having flown into the runner 6 flows through flow paths between the respective runner blades 10. The runner blades 10 receive a pressure from the water flowing through the flow paths, so that the runner 6 is driven in rotation, and the rotation speed N of the runner 6 increases. Thus, as shown in FIG. 4B, the rotation speed N of the runner 6 can be increased up to the first rotation speed N1 at the time T3.

The first rotation speed N1 is a rotation speed that is smaller than the rated rotation speed N0 of the runner. The first rotation speed N1 may be a rotation speed that is 30% or more of the rated rotation speed N0 of the runner 6, for example. In addition, a difference between a peripheral speed V0 of an outer peripheral edge 13 of the runner blade 10 at the rated rotation speed N0 and a peripheral speed V1 of the outer peripheral edge 13 of the runner blade 10 at the first rotation speed N1, which is described below, may be 50 m/sec or less.

After the first rotation-speed increasing step, the second rotation-speed increasing step is performed. In this second rotation-speed increasing step, the increase in the rotation speed N of the runner 6 is accelerated by opening the guide vanes 5 at a second opening G2 (startup opening G2) that is larger than the minute opening G1. The second rotation-speed increasing step includes a second opening increasing step in which the opening G of the guide vanes 5 is increased up to the startup opening G2 and a startup-opening maintaining step in which the opening G of the guide vanes 5 is maintained at the startup opening G2.

In the second rotation-speed increasing step, as shown in FIGS. 4A and 4B, the second opening increasing step is performed from the time T3 t a time T4. In this step, the opening G of the guide vanes 5 is increased from the minute opening G1 up to the startup opening G2 by rotating the guide vanes 5 to open. Thus, a width of each flow path between the guide vanes 5 widens, so that a larger amount of water starts to flow into the runner 6.

Then, as shown in FIGS. 4A and 4B, the startup-opening maintaining step is performed from the time T4 to a time T5. In this step, the opening G of the guide vanes 5 is maintained at the startup opening G2. During this step, the water having flown into the casing 3 continues flowing into the runner 6 through the flow paths between the respective guide vanes 5. The water having flown into the runner 6 flows through flow paths between the respective runner blades 10. The runner blades 10 receive a pressure from the water flowing through the flow paths, so that the runner 6 is driven in rotation, and the rotation speed N of the runner 6 increases. Thus, as shown in FIG. 4B, the rotation speed N of the runner 6 can be increased up to the second rotation speed N2 at the time T5.

In this manner, by increasing a flow rate of the water to be guided to the runner 6 by increasing the opening G of the guide vanes 5 from the minute opening G1 to the startup opening G2, the rotation speed N of the runner 6 can be rapidly increased. This can suppress elongation of a startup time of the Francis turbine 1.

As described above, the startup opening G2 is an opening that is larger than the minute opening G1. The startup opening G2 may be an opening that is 10% or more and 20% or less of a maximum opening of the guide vanes 5, for example. The second rotation speed N2 is a rotation speed that is larger than the first rotation speed N1 and smaller than the rated rotation speed N0 of the runner 6. The second rotation speed N2 may be a rotation speed that is 80% or more and 95% or less of the rated rotation speed N0 of the runner 6.

After the second rotation-speed increasing step, the rotation-speed regulating step is performed. In this rotation-speed regulating step, the rotation speed N of the runner 6 is regulated to the rated rotation speed N0 by opening the guide vanes 5 at the no-load opening G3. The rotation-speed regulating step includes an opening decreasing step in which the opening G of the guide vanes 5 is decreased down to the no-load opening G3 and a no-load-opening maintaining step in which the opening G of the guide vanes 5 is maintained at the no-load opening G3.

In the rotation-speed regulating step, as shown in FIGS. 4A and 4B, the opening decreasing step is performed from the time T5 to a time T6. In this step, the opening G of the guide vanes 5 is decreased from the startup opening G2 down to the no-load opening G3 by rotating the guide vanes 5 to close.

Then, as shown in FIGS. 4A and 4B, the no-load-opening maintaining step is performed from the time T6 to a time T7. In this step, the opening G of the guide vanes 5 is maintained at the no-load opening G3. During this step, the runner 6 is driven in rotation by the water flowing into the runner 6, so that the rotation speed N of the runner 6 further increases. As shown in FIG. 4B, this enables the rotation speed N of the runner 6 to reach the rated rotation speed N0 at the time T7.

In this manner, the increase in rotation speed N of the runner 6 is moderated by decreasing the opening G of the guide vanes 5 is decreased from the startup opening G2 down to the no-load opening G3 to lower a flow rate of the water to be guided to the runner 6 before the rotation speed N of the runner 6 reaches the rated rotation speed N0. Thus, the rotation speed N of the runner 6 can be gradually increased to reach the rated rotation speed N0 while being prevented from exceeding the rated rotation speed N0.

As described above, the no-load opening G3 is an opening that is smaller than the startup opening G2. The no-load opening G3 may be an opening that is 5% or more and 15% or less of the maximum opening of the guide vanes 5, for example.

In the aforementioned inflow starting step, the aforementioned first rotation-speed increasing step, the aforementioned second rotation-speed increasing step and the aforementioned rotation-speed regulating step, the opening and closing of the inlet valve 22, the opening and closing of the bypass valve 24 and the regulation of the opening G of the guide vanes 5 may be performed by the control unit C. However, they may be manually operated by an operator, instead of the control unit C.

In this manner, the rotation speed N of the runner 6 is regulated to the rated rotation speed N0, and the Francis turbine 1 according to the embodiment is started up. Thereafter, the Francis turbine 1 performs a normal operation (load operation), in which rotational energy of the runner 6 is transmitted to the generator 11 and the generator 11 generates electricity.

Figure 5:
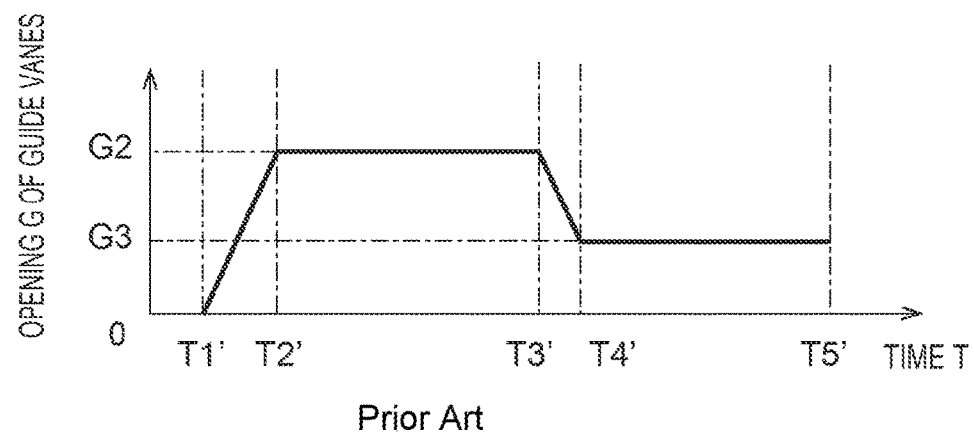
FIG. 5 is a time diagram showing an opening of guide vanes in a general startup method of a Francis turbine.

Next, the operations and the effects of the startup method of the Francis turbine 1 according to the embodiment is described with reference to FIGS. 5 to 7.

A general startup method of the Francis turbine 1 is described. Generally, upon startup of the Francis turbine 1, as shown in FIG. 5, the inlet valve 22 is opened to start inflow of water into the casing 3 (at a time T1'). Then, the guide vanes 5 are opened at the startup opening G2 to increase the rotation speed N of the runner 6 (from a time T2' to a time T3'). Thereafter, when the rotation speed N of the runner 6 has reached a predetermined rotation speed, the opening of the guide vanes 5 is decreased down to the no-load opening G3 to regulate the rotation speed N of the runner 6 to the rated rotation speed N0 (from a time T4' to a time T5').

Figure 6:
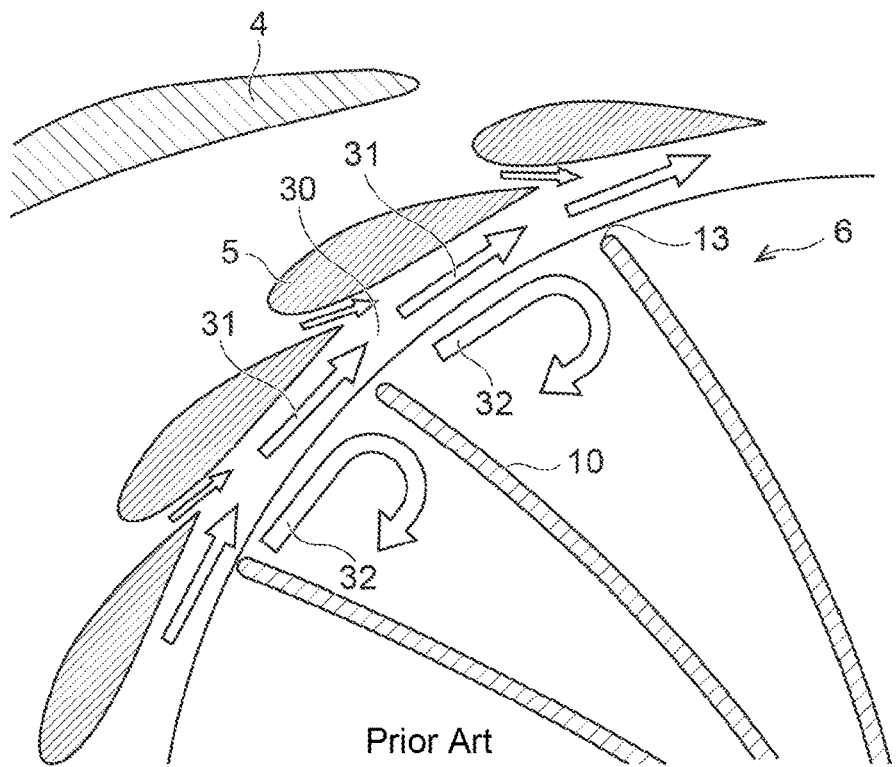
FIG. 6 is a partially enlarged top cross-sectional view showing a water flow when guide vanes are opened at a startup opening in the general startup method of a Francis turbine.
Figure 7:
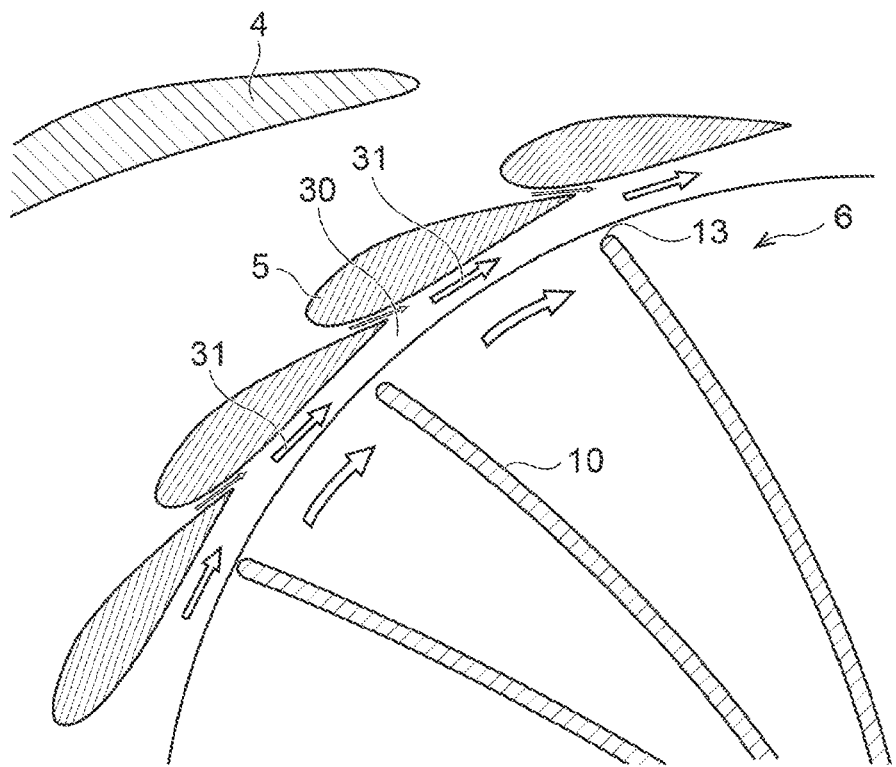
FIG. 7 is a partially enlarged top cross-sectional view showing a water flow when guide vanes are opened at a minute opening in the startup method of a Francis turbine according to the embodiment.

In this case, when the guide vanes 5 are opened at the aforementioned startup opening G2, as shown in FIG. 6, an annular flow path 30 is formed between the guide vanes 5 and the runner 6 in the radial direction. The water having flown through the flow paths between the respective guide vanes 5 may flash through the annular flow path 30, creating a fast swirling flow 31 around the runner 6. When the swirling flow 31 collides with the runner blades 10, a separation flow 32 may occur. At this time, a pressure inside the runner 6 may decrease down to a saturated water vapor pressure or below. This causes the water to evaporate, so that water vapor bubbles are generated in the water. At the moment when the water vapor in the water vapor bubbles condenses, the pressure may abruptly increase. This may damage the runner 6 because an impact load may be applied to the runner 6.

On the other hand, in this embodiment, as described above, before the guide vanes 5 are opened at the startup opening G2, the guide vanes 5 are opened at the minute opening G1 and the rotation speed N of the runner 6 reaches the first rotation speed N1 (see FIGS. 4A and 4B). As shown in FIG. 7, when the guide vanes 5 are opened at the minute opening G1, minute flow paths are formed between the respective guide vanes 5. The water having flown into the casing 3 flows into the runner 6 through these minute flow paths. In the minute flow paths, a pressure loss becomes large and the energy of the pressure converted to the kinetic energy of the swirling flow 31 becomes small. Thus, while the guide vanes 5 are being opened at the minute opening G1, a speed of the swirling flow 31 flowing through the annular flow path 30 can be reduced, whereby occurrence of the separation flow 32 can be suppressed.

On the other hand, while the guide vanes 5 are being opened at the minute opening G1, the rotation speed N of the runner 6 can be increased. In this embodiment, the guide vanes 5 are opened at the startup opening G2 after the rotation speed N of the runner 6 has reached the first rotation speed N1. When the guide vanes 5 are opened at the startup opening G2, a fast swirling flow 31 may occur around the runner 6, similarly to the case shown in FIG. 6. At this time, in this embodiment, since the rotation speed N of the runner 6 has already reached the first rotation speed N1, the peripheral speed V of the outer peripheral edge 13 of the runner blade 10 has reached a corresponding peripheral speed V1. Thus, a speed difference between the speed of the swirling flow 31 and the peripheral speed V of the outer peripheral edge 13 of the runner blade 10 when the guide vanes 5 are opened at the startup opening G2 can be reduced. This can alleviate a momentum at which the swirling flow 31 collides with the runner blade 10, whereby occurrence of the separation flow 32 can be suppressed.

According to the embodiment, in the first rotation-speed increasing step upon startup of the Francis turbine 1, the rotation speed N of the runner 6 is increased by opening the guide vanes 5 at the minute opening G1 that is half or less than the no-load opening G3. Thus, in the first rotation-speed increasing step, the rotation speed N of the runner 6 can be increased while the speed of the swirling flow 31 is suppressed. Accordingly, in the second rotation-speed increasing step, a speed difference between the speed of the swirling flow 31 and the peripheral speed V of the outer peripheral edge 13 of the runner blade 10 when the guide vanes 5 are opened at the startup opening G2 can be reduced. This can alleviate a momentum at which the swirling flow 31 collides with the runner blade 10, whereby occurrence of the separation flow 32 can be suppressed. As a result, it can be suppressed that the impact load caused by the separation flow 32 is applied to the runner 6, and the damage to the runner 6 can be suppressed.

In addition, according to the embodiment, the first rotation speed N1 is a rotation speed that is 30% or more of the rated rotation speed N0. By setting the first rotation speed N1 to a rotation speed that is 30% or more of the rated rotation speed N0, in the second rotation-speed increasing step, a speed difference between the speed of the swirling flow 31 and the peripheral speed V of the outer peripheral edge 13 of the runner blade 10 when the guide vanes 5 are opened at the startup opening G2 can be reduced. This can further alleviate a momentum at which the swirling flow 31 collides with the runner blade 10, whereby occurrence of the separation flow 32 can be further suppressed.

In addition, according to the embodiment, a difference between the peripheral speed V0 of the outer peripheral edge 13 of the runner blade 10 at the rated rotation speed N0 and the peripheral speed V1 of the outer peripheral edge 13 of the runner blade 10 at the first rotation speed N1 is 50 m/sec or less. By opening the guide vanes 5 at the startup opening G2 when the outer peripheral edge 13 of the runner blade 10 has such a relatively fast peripheral speed V1, it is possible to further alleviate a momentum at which the swirling flow 31 collides with the runner blade 10, whereby occurrence of the separation flow 32 can be further suppressed.

According to the embodiment described above, the damage to the runner can be suppressed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the sprit of the inventions. The accompanying claims and their equivalents are intended to cover such forms or modifications as would fail within the scope and spirit of the invention.

In the aforementioned embodiment, the example in which the Francis turbine is a pump turbine that can perform a pumping operation. However, not limited thereto, the Francis turbine may be configured not to perform a pumping operation.

The invention claimed is:

1. A startup method of a Francis turbine comprising a guide vane capable of regulating a flow rate of water to be guided to a runner, the startup method comprising:
   a first rotation-speed increasing step in which a rotation speed of the runner is increased by opening the guide vane at a first opening;
   a second rotation-speed increasing step in which the increase in the rotation speed of the runner is accelerated by opening the guide vane at a second opening that is larger than the first opening after the first rotation-speed increasing step; and
   a rotation-speed regulating step in which the rotation speed of the runner is regulated to a rated rotation speed by opening the guide vane at a no-load opening after the second rotation-speed increasing step,
   wherein the first opening is 50% or less than 50% of the no-load opening.

2. The startup method of a Francis turbine according to claim 1, wherein:
   in the first rotation-speed increasing step, the rotation speed of the runner reaches a first rotation speed; and
   the first rotation speed is a rotation speed that is 30% or more of the rated rotation speed, or a difference between a peripheral speed of an outer circumferential part of the runner at the rated rotation speed and a peripheral speed of the outer circumferential part of the runner at the first rotation speed is 50 m/sec or less.

3. A Francis turbine comprising:
   a runner;
   a guide vane capable of regulating a flow rate of water to be guided to the runner; and
   a control unit that controls the guide vane,
   wherein the control unit controls the guide vane to perform:
   a first rotation-speed increasing step in which a rotation speed of the runner is increased by opening the guide vane at a first opening;
   a second rotation-speed increasing step in which the increase in the rotation speed of the runner is accelerated by opening the guide vane at a second opening that is larger than the first opening after the first rotation-speed increasing step; and
   a rotation-speed regulating step in which the rotation speed of the runner is regulated to a rated rotation speed by opening the guide vane at a no-load opening after the second rotation-speed increasing step,
   wherein the first opening is 50% or less than 50% of the no-load opening.

\* \* \* \* \*